Oct. 31, 1961 S. E. ARNETT ET AL 3,006,144
FUEL CONTROL APPARATUS RESPONSIVE TO
APPROACHING ENGINE INSTABILITY
Filed July 26, 1956 5 Sheets-Sheet 1

INVENTORS
SAMUEL E. ARNETT.
HARRY E. STARR.
BY
ATTORNEY.

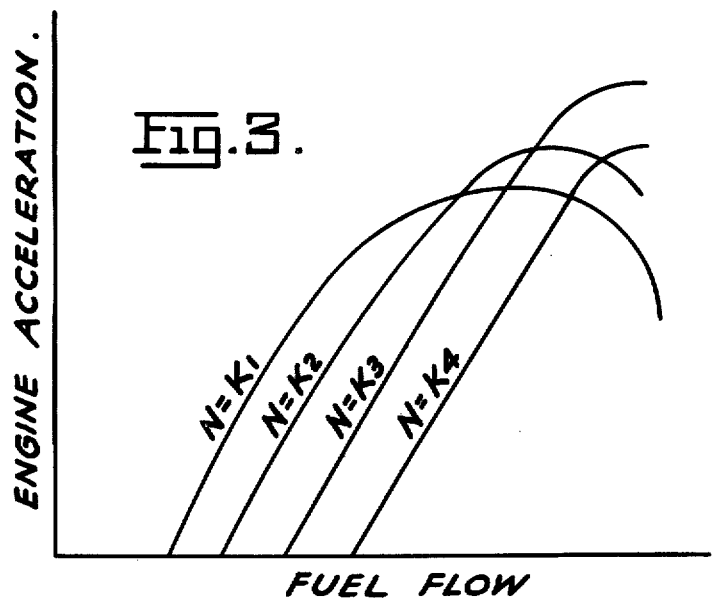
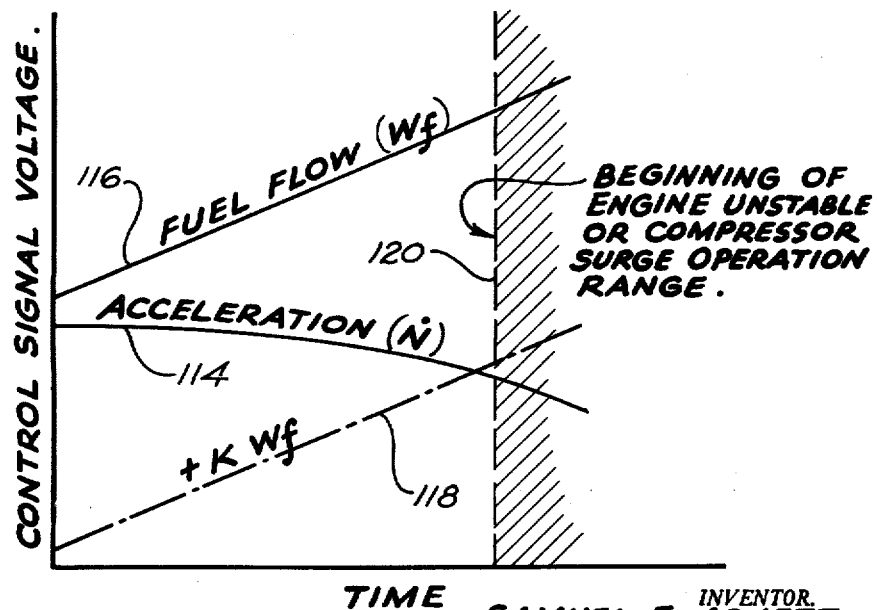

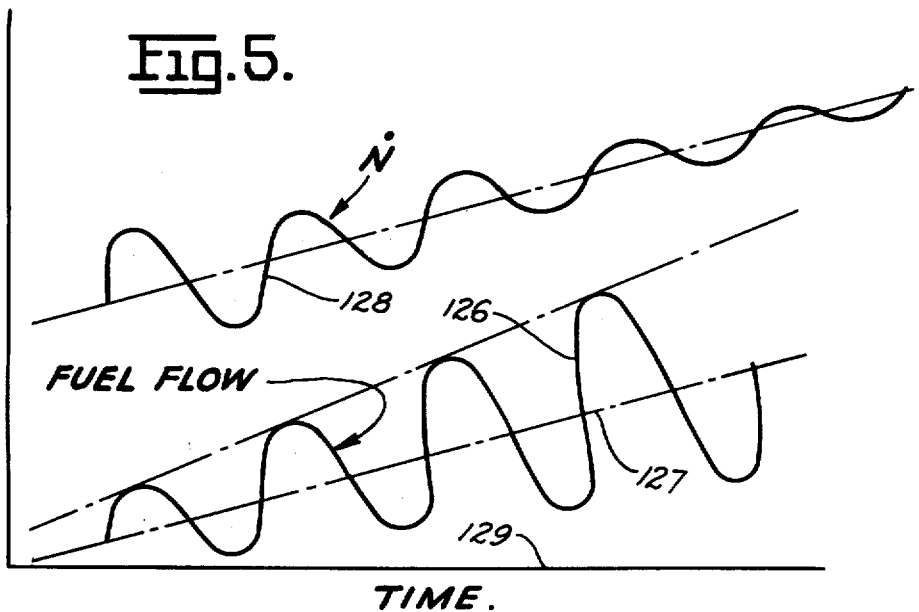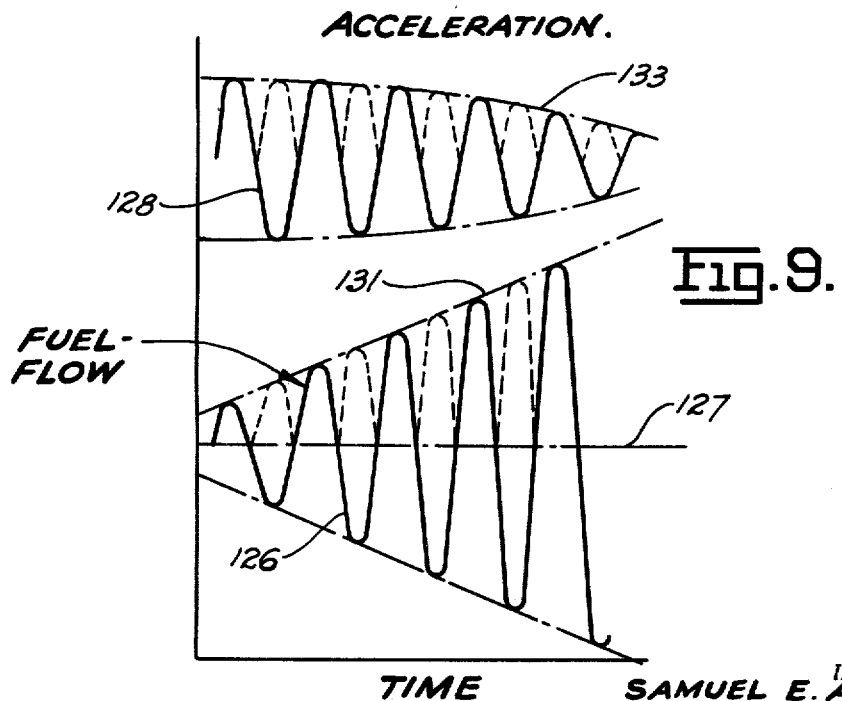

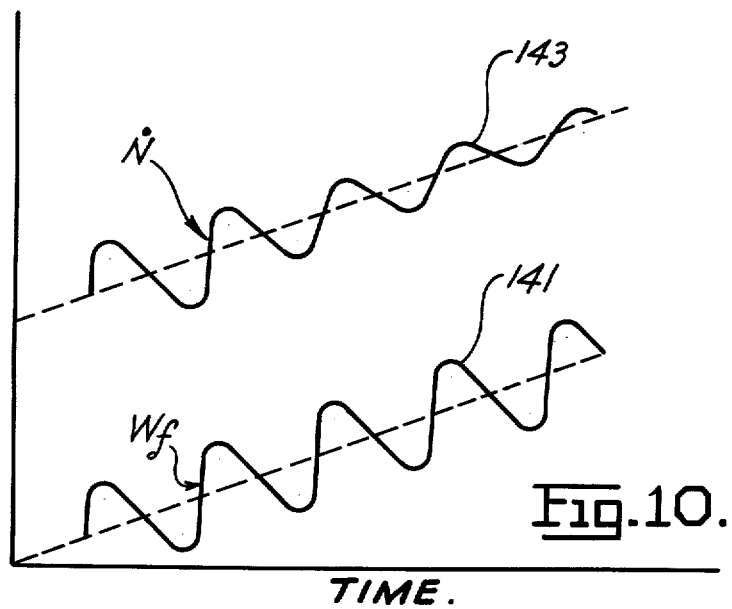
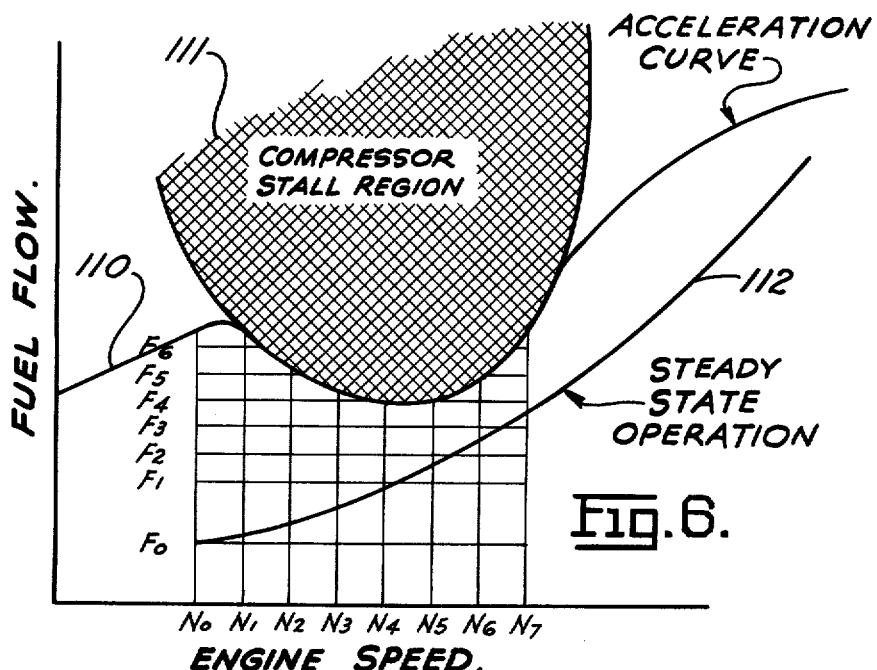

United States Patent Office 3,006,144
Patented Oct. 31, 1961

3,006,144
FUEL CONTROL APPARATUS RESPONSIVE TO APPROACHING ENGINE INSTABILITY
Samuel E. Arnett and Harry E. Starr, South Bend, Ind., assignors to The Bendix Corporation, a corporation of Delaware
Filed July 26, 1956, Ser. No. 600,182
7 Claims. (Cl. 60—39.28)

This invention relates to a fuel control apparatus and more particularly to fuel control apparatus for a gas turbine or the like prime mover or engine.

It is an object of the present invention to provide an improved fuel control apparatus for an internal combustion engine.

It is another object of the present invention to provide an improved fuel control apparatus for a combustion engine such as a reciprocating piston engine or a gas turbine type of engine.

It is a further object of the present invention to provide an improved fuel control apparatus for an internal combustion engine, which fuel control apparatus introduces a first change in the fuel flow to the engine to produce thereby a second change in a predetermined operating condition of the engine for the purpose of controlling the operation of the engine.

It is an additional object of the present invention to provide an improved fuel control apparatus for an internal combustion engine, which fuel control apparatus provides a known modulation or change in the fuel supplied to the engine whenever the engine compressor approaches its unstable or surge range of operation, such that a control signal can be obtained from the resultant compressor operating condition for controlling the engine operation such that this compressor unstable or stall range may be substantially avoided.

These and other objects and advantages of the present invention will become apparent in view of the following description taken in conjunction with the drawings wherein:

FIGURE 3 is a curve chart illustrating engine acceleration plotted against fuel flow to illustrate the operation of the fuel control apparatus in accordance with the present invention;

FIGURE 4 is a curve chart illustrating control signal voltage in accordance with the present invention plotted as a function of fuel flow to show the operation of the comparison circuit shown in FIGURE 2;

FIGURE 5 is a curve chart showing engine acceleration and fuel flow plotted as a function of time;

FIGURE 6 is a curve chart showing fuel flow plotted as a function of engine speed to illustrate the operation of the control apparatus in accordance with the present invention;

FIGURE 9 is a curve chart showing the manner of obtaining the engine acceleration control signal and fuel flow control signal, as shown in FIGURE 4;

FIGURE 10 is a curve chart illustrating engine acceleration and fuel flow plotted as a function of time, where the fuel flow modulation is a substantially fixed amplitude.

Figure 1:
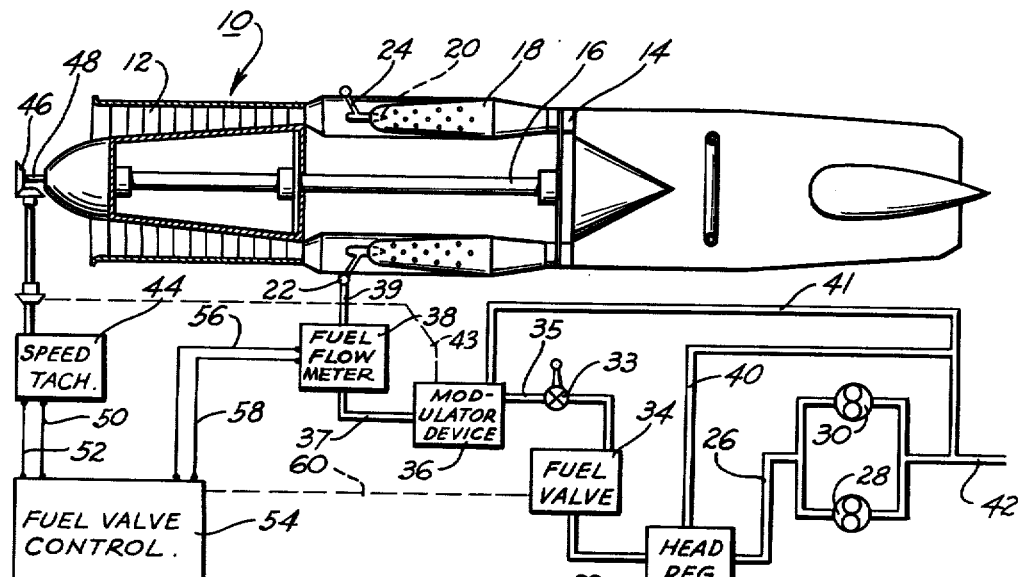
FIGURE 1 is a schematic showing of a gas turbine engine equipped with fuel control apparatus in accordance with the present invention.

Referring to FIGURE 1 of the drawings there is shown a gas turbine engine 10 including a compressor 12, and a turbine 14 connected to said compressor through a drive shaft 16. Fuel combustion chambers 18 are shown, including a fuel nozzle 20 and a fuel manifold 22 connected to the individual fuel nozzles through fuel lines 24. The fuel manifold 22 is connected to the outlet fuel conduit 26 of the parallel connected fuel pumps 28 and 30 through a control pressure or head regulating valve 32, the main fuel valve 34, the manual cut-off valve 33, the fuel flow modulator device 36, and a fuel flow responsive meter or indicator device 38. A fuel by-pass conduit 40 is connected between the head regulator device 32 and the fuel conduit 42 leading from a fuel supply (not shown) to the inlet of the fuel pumps 28 and 30. The fuel flow modulator device 36 may be of the by-pass type including a fuel by-pass conduit 41. An engine speed responsive electrical signal generating tachometer device 44 is connected to the bevel gears 46 through a connecting drive shaft 48 to the compressor unit 12 of the engine 10. The electrical output of the speed tachometer device 44 is connected through conductors 50 and 52 to a fuel valve control device 54. Similarly the electrical output of the fuel flow responsive meter or device 38 is connected through conductors 56 and 58 to the fuel valve control device 54. The output of the fuel valve control device 54 is connected through control member 60 to control the operation of the fuel valve 34 as well known to those persons skilled in this art.

Figure 2:
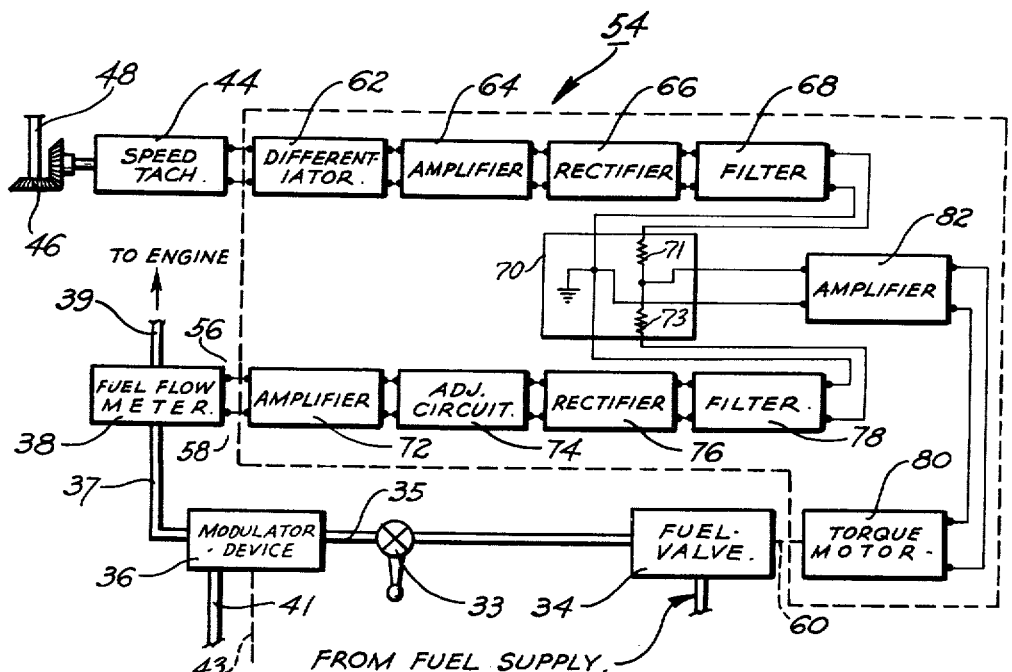
FIGURE 2 is a block diagram schematic showing of the fuel valve control apparatus shown in FIGURE 1.

Referring to FIGURE 2 there is shown an electrical schematic of the fuel valve control 54 shown in FIGURE 1. In FIGURE 2 there is shown the speed responsive tachometer 44 connected through conductors 50 and 52 to a differentiator circuit 62, for example the well known resistance-capacitor type, which leads to an amplifier 64 then a rectifier circuit 66 and a filtering circuit 68 to a signal comparison circuit 70, the latter including resistance members 71 and 73 connected as shown to receive the output of filters 68 and 78, respectively and to produce an output signal representative of the algebraic difference of the signals received, which output signal is then amplified through amplifier 82. The fuel flow responsive meter 38 is shown connected through conductors 56 and 58 to an amplifier device 72 then an adjustment circuit 74, if desired, and a rectifier circuit 76 and a filter circuit 78 to the comparison circuit 70. The comparison circuit 70 is operative to compare the acceleration control signal received from the speed control circuit including the filter 68 with the fuel flow responsive control signal received from the fuel flow control circuit including the filter 78, to derive a comparison or difference signal for controlling the torque motor 80 through the amplifier circuit 82 and hence for controlling a movable valve member or the like of the fuel valve 34. The differentiator circuit 62 is conventional and reference is made to the publication "GAP/R Electronics Analog Computing Devices" published by George A. Philbrick Researches, Inc. (1953), 230 Congress Street, Boston 10, Massachusetts in which there is shown a K3–D differentiating component that is well suited to perform the function associated with applicants' differentiator 62. Also applicants' comparison circuit 70 is the equivalent of the K3–A adding component shown in said publication.

The amplifiers 64, 72 and 82, as well as rectifiers 66 and 76, are conventional and perform the usual well-known function of rectifiers and amplifiers as will be readily understood by those skilled in the art. Likewise, the filters 68 and 78 are not unusual in their function and it will be apparent to those persons skilled in the art that any conventional electrical filter can be used to derive the curve envelope in FIGURE 9 hereinafter described.

The speed tachometer device 44 may be of a conventional speed responsive electrical signal generator type having an output signal the magnitude of which is a function of engine speed. The differentiator circuit 62 is operative to differentiate the speed output signal from the speed tachometer 44 such that an acceleration control signal is derived which corresponds to the change of speed with respect to time of the engine 10 and hence the acceleration of the engine. This acceleration control signal is amplified in the amplifier 64 and is rectified in the rectifier circuit 66 and filtered in the circuit 68, as later described relative to FIGURE 9, such that an acceleration control signal is supplied to the comparison circuit 70 which corresponds to the acceleration of the engine 10, and is shown plotted as curve 114 of FIGURE 4. The fuel flow responsive meter or device 38 may be of the cantilever beam transducer type, as illustrated in FIGURE 7.

Figure 7:
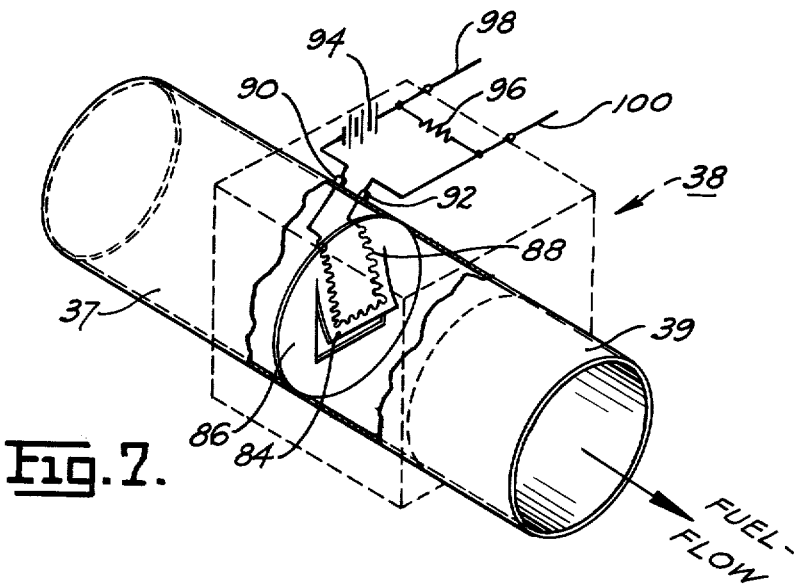
FIGURE 7 is a schematic showing of the fuel flow responsive device shown in FIGURE 1.

In FIGURE 7 there is shown a first fuel conduit 37 which receives fuel from the manual cut-off valve 36 and supplies fuel to the fuel responsive flow meter 38. A second fuel conduit 39 may be connected to the fuel manifold 22 as shown in FIGURE 1. The fuel flowing from the conduit 37 to the conduit 39 passes around the cantilever beam member 84 and causes it to deflect relative to the adjacent passage restriction member 86 such that the cantilever beam member 84 is deflected by an amount proportional to the fuel flow from the conduit 37 to the conduit 39. A stress-variable electrical resistance member 88 is attached to the cantilever beam member 84 and is thereby stressed such that its electrical resistance changes by an amount in proportion to the deflection of the cantilever beam 84, thereby providing an electrical resistance change between the terminals 90 and 92 corresponding to the fuel flow from the conduit 37 to the conduit 39. If a reference power supply such as the battery 94 is connected through the resistance member 96 and across the terminals 90 and 92, there will appear at the terminals 98 and 100 which are connected across the resistance 96 a voltage or control signal which varies in proportion to the fuel flow from the conduit 37 to the conduit 39. The conductors 56 and 58 shown in FIGURE 1 may be connected to the terminals 98 and 100 shown in FIGURE 7.

The output of the amplifier 72 as shown in FIGURE 2 is then applied to an adjustment circuit which may be uitilzed to adjust the potential level of the signal received from the amplifier 72 as will be more fully explained subsequently with reference to the comparison circuit 70 and the curve chart of FIGURE 4. The output of the adjustment circuit 74 is applied through the rectifier 76 and filter device 78 to the comparison circuit 70 in a manner similar to the application of the acceleration control signal as previously described.

In FIGURE 3 there is shown a curve chart illustrating the engine acceleration as a function of fuel flow for particular operating speeds of the engine. A reference to the curve chart shown in FIGURE 6 will illustrate how the curve chart shown in FIGURE 3 may be obtained. In FIGURE 6 there is shown a plot of fuel flow versus engine speed for a gas turbine type of engine such as illustrated in FIGURE 1. The compressor stall or surge region 111 is to be avoided, and hence it is the normal practice for the acceleration of the engine to be controlled such that the maximum engine acceleration will follow the acceleration curve 110 shown in FIGURE 6. The steady state operation of the engine is in accordance with the steady state curve 112. Beginning with an engine operating speed corresponding to $N_0$ and a fuel flow corresponding to $F_0$ on the steady state curve 112, if the fuel flow is rapidly increased to the value $F_1$ the engine speed will increase in accordance with the horizontal $F_1$ line and as the engine speed passes the respective $N_1$, $N_2$, $N_3$ and $N_4$ speeds, the acceleration of the engine or the rate of speed change as the engine passes through the respective speeds $N_1$, $N_2$, $N_3$ and $N_4$ will give a point for plotting the respective curves shown in FIGURE 3. If the engine speed is again returned to $N_0$ and an amount of fuel corresponding to the value $F_2$ be supplied to the engine, the engine speed will increase in accordance with the horizontal $F_2$ line and the engine acceleration as it passes the $N_1$ speed will give a second point for plotting the $N=K_1$ curve, as the engine passes the $N_2$ speed the acceleration of the engine at this speed will give a second point for the $N=K_2$ curve shown in FIGURE 3, and so forth for the $N_3$, $N_4$ and $N_5$ engine speeds. Now if the engine speed is returned to the $N_0$ speed and an amount of fuel corresponding to the value $F_3$ be supplied to the engine, the acceleration of the engine past the $N_1$ speed will give a third plotting point for the $N=K_1$ acceleration curve. The acceleration of the engine as the engine speed passes the $N_2$ speed will give a third point for plotting the $N=K_2$ acceleration curve shown in FIGURE 3, and so forth. Now if the engine speed is returned to the $N_0$ speed and an amount of fuel corresponding to the value $F_4$ be supplied to the engine, the engine acceleration as the engine passes the $N_1$ speed will give a fourth plotting point for the $N=K_1$ acceleration curve, the engine acceleration as the engine passes the $N_2$ engine speed will give a fourth plotting point for the $N=K_2$ acceleration curve, and so forth for the other engine speeds. In this manner the acceleration curves as shown in FIGURE 3 may be plotted.

In FIGURE 4 there is shown an acceleration control signal versus fuel flow control signal plot which illustrates the operation of the comparison circuit 70 as shown in FIGURE 2. The acceleration control signal supplied to the comparison circuit 70 from the filter 68 corresponds to the acceleration control signal curve 114. The fuel flow responsive control signal which would be applied to the comparison circuit 70 from the filter 78 corresponds to the fuel flow control signal curve 116 were it not for the adjustment circuit 74. The adjustment circuit 74 includes a conventional electrical potentiometer, not shown, connected to the amplifier 72 in a manner well known to those persons skilled in the art so as to cause an increase or a decrease, as desired, in the voltage output signal of the amplifier 72 whereupon the fuel flow control voltage signal represented by curve 116 may be lowered or raised accordingly. The desired point of intersection of the acceleration control signal curve 114 and fuel flow control signal 116 is determined empirically in accordance with the particular stall characteristics exhibited by any given engine and the adjustment circuit 74 is set accordingly when the fuel control system is calibrated. With an engine having the stall characteristics indicated in FIGURE 4, the fuel flow control signal curve 116 and the acceleration control signal 114 are not compatible in that they diverge and, in order to effect intersection of the two curves 116 and 114 at a point located slightly before the indicated stall region, the curve 116 is biased through suitable adjustment of the adjustment circuit 74.

For instance, assuming the fuel flow voltage signal to have a certain positive value and the amplifier 72 output voltage control signal to have a corresponding certain positive value, the adjustment circuit 74 may be adjusted to apply a positive or negative voltage to the amplifier 72 output voltage control signal to cause a corresponding increase or decrease in the said output voltage control signal thereby adjusting the curve 116 up or down, as desired. In this manner and with the engine in actual operation the comparison circuit 70 can be made to effect a comparison of the acceleration control signal corresponding to the acceleration curve 114 and the corrected or adjusted fuel flow control signal corresponding to the curve 118 for controlling through the amplifier 82 and the torque motor 80 as shown in FIGURE 2 the operation of fuel valve 34, such that when the operation of the engine 10 including the compressor 12 approaches the characteristic unstable operation range as indicated by the vertical line 120, the fuel flow to the engine as controlled by the fuel valve 34 can be changed or decreased to thereby avoid the unstable operation region. In this respect a compressor stall or surge region 111 is illustrated in FIGURE 6 as the upper cross-hatched portion above the acceleration curve 110. An unstable operation of the engine per se could in this manner be avoided also.

In FIGURE 5 the curve 126 illustrates one form of fuel flow modulation relative to time which may be introduced by the modulator device 36 shown in FIGURES 1 and 2. The acceleration curve 128 illustrates the behavior of the engine as a result of the fuel flow pattern shown by curve 126.

With further reference to the fuel flow modulation relative to time as shown by curve 126 of FIGURE 5, the fuel flow to the engine may be made to increase as a function of time as shown by the average or reference curve 127 to approach the fuel flow necessary to produce engine unstability or compressor stall. In this respect it may be desirable to vary the fuel flow as a function of the quantity of fuel flow as shown by the average fuel flow curve 127 to thereby make the engine behavior in response to fuel flow substantially the same regardless of engine operating altitude. Therefore, as the fuel flow increases in accordance with the fuel flow average curve 127 of FIGURE 5, the magnitude of the fuel flow changes or modulation pulses effectively increases, by virtue of the by-pass operation of modulator device 36 in that the fuel nozzle back pressure and hence the fuel pressure in manifold 22 increases with fuel flow and this increases the pressure drop across modulator device 36.

In FIGURE 9 the average fuel flow curve 127 has been plotted horizontally to illustrate the operation of the fuel flow control circuit including the amplifier 72, the adjustment circuit 74, the rectifier 76 and the filter 78. The rectifier 76, if of the full wave rectifier type will add the dotted modulation pulses as shown in FIGURE 9. The filter 78 will provide a fuel flow control signal corresponding in angular position and generally to the curve envelope 131, and this is effectively the fuel flow control signal curve 116 of FIGURE 4. The potential adjustment circuit 74 of FIGURE 2 transposes the fuel flow control signal curve 116 to the level of the curve 118.

Similarly the acceleration control signal curve envelope 133 as shown in FIGURE 9 and similarly obtained with the filter 68 corresponds to the curve 114 as shown in FIGURE 4.

Also shown in FIGURE 5 is the resultant attenuation or diminishing in magnitude of the acceleration signal as the engine unstable operating region or the compressor stall condition is approached as seen by the right hand portion of the curve 128, where the magnitude is diminishing as compared to the left hand portion of the curve 128. This diminishing or attenuation of the acceleration curve 128 can be utilized by the comparison circuit 70 for the control of fuel flow to the engine by suitable control of the fuel valve 34.

Figure 8:
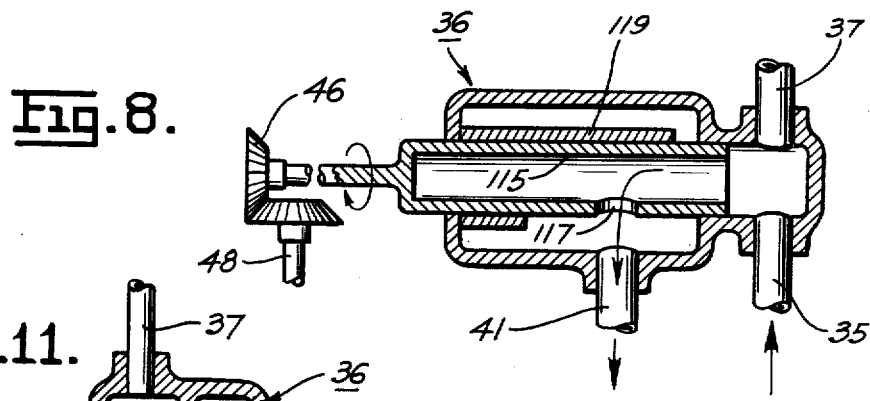
FIGURE 8 is a schematic showing of the fuel modulator device shown in FIGURE 1.

In FIGURE 8 there is shown a suitable by-pass type of fuel flow modulator device 36 connected between the fuel conduits 35 and 37 as shown in FIGURE 1. The fuel flow curve 126 shown in FIGURE 5 results from the operation of the modulator device 36. There is provided a rotating valve member 115 including a fuel port 117, and an outer stationary sleeve 119 which blocks the fuel port 117 during part of the rotary travel of valve member 115. A similar by-pass type fuel modulator device is shown in copending application Serial No. 600,184, filed July 26, 1956 by the same inventors.

In the operation of the apparatus in accordance with the present invention it has been observed by actual engine tests that just prior to the engine unstable operating region or compressor stall or surge there occurred a drop in compressor discharge pressure followed by pressure oscillations having a frequency of approximately 50 percent engine speed i.e., for an engine speed of 5000 r.p.m. at which stall may occur the frequency of compressor discharge pressure oscillation would be .50 times 4800 r.p.m. or 2400 cycles per minute. There also occurs an attenuation in the modulated engine acceleration signal as shown by curve 128 of FIGURE 5. This attenuation is due to acceleration peaking of the engine as shown in FIGURE 3. As further shown by FIGURE 3 there occurs a definite and clear cut acceleration peaking in the lower speed ranges with a somewhat less definite peaking effect for the higher speed ranges. In order to avoid total stall of the compressor, the fuel flow must be reduced when this so attenuated acceleration control signal reaches a predetermined minimum level. To establish the control point at which the fuel flow is to be reduced the acceleration control signal can be compared with the fuel flow control signal in the comparison circuit 70 of FIGURE 2. In this respect it has been determined that a first quantity corresponding to the acceleration control signal, minus a second quantity corresponding to the fuel flow control signal times an adjustment constant K as determined by the adjustment circuit 74, should be greater than or equal to zero. As long as this relationship is maintained positive, in other words the first quantity is preferably larger than the second quantity, fuel flow to the engine can be increased or maintained at a normal rate. However, if the adjusted fuel flow control signal in accordance with curve 118 as shown in FIGURE 4 becomes greater for any fuel flow condition than the acceleration control signal corresponding to the curve 114, then the fuel flow to the engine should be decreased to avoid entering the compressor stall region as represented by the vertical curve or line 120 of FIGURE 4. This relationship is clearly shown in FIGURE 4 by the intersection of the acceleration control signal curve 114 and the adjusted fuel flow control signal curve 118. A control voltage representing this comparison appears in the output of the comparison circuit 70 and thus a fuel valve control signal is thereby established for the torque motor 80 such that fuel flow to the engine as determined by the fuel valve 34 may be decreased when the danger of engine unstable operation or compressor stall is approached.

Figure 11:
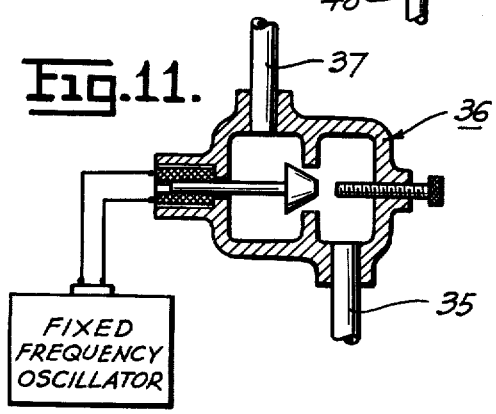
FIGURE 11 is a schematic showing of a modified fuel modulator device for obtaining the fuel flow modulation as shown in FIGURE 10.

In FIGURE 10 there is shown a curve chart illustrating a modified fuel flow modulation, where the amplitude of the modulation or change remains substantially the same regardless of fuel flow to the engine. The fuel flow modulation apparatus shown in FIGURE 11 may be used to accomplish the latter fuel flow modulation. It should be understood relative to the fuel flow curve 141 shown in FIGURE 10 that the fuel flow control signal curve 116 as shown in FIGURE 4 corresponding to the fuel flow curve 141 of FIGURE 10 would be substantially horizontal but would still provide an intersection with the acceleration control signal curve 114, when adjusted or repositioned, ahead of or prior to the beginning of the engine unstable operating range as represented by the line 120. The engine acceleration curve 143 of FIGURE 10 is similar to the curve 128 of FIGURE 5.

Referring to FIGURE 1 it should be understood that the fuel flow modulator device 36 may be connected into the fuel supply conduit for the engine 10 as a by-pass, or it may be connected directly into the line as illustrated in FIGURE 1 and as shown in FIGURE 8. The frequency of fuel flow modulation may for example be in the order of five cycles per second with a double modulation amplitude in the order of 20 percent of the instantaneous fuel flow for the engine.

It should be further understood that one form of suitable fuel flow modulation method and apparatus may be in accordance with the teachings of copending application Serial No. 357,661 filed May 27, 1953 by Rudolph Bodemuller and assigned to the same assignee as the present application.

Although only the preferred embodiments of the present invention have been schematically illustrated and described it will be apparent to those skilled in the art that various changes in the structure and relative arrangement of parts may be made to suit individual requirements without departing from the scope and spirit of the present invention.

We claim:

1. In fuel control apparatus for a combustion engine including a compressor having a characteristic range of unstable operation, the combination of a fuel conduit for supplying fuel to the engine, a fuel valve connected to said conduit for controlling the fuel flow through said conduit, valve means operative with said conduit for effecting a predetermined periodic variation in the rate of flow of fuel to said engine, first means operatively connected to said conduit for sensing said periodically varying flow of fuel therethrough, second means operatively connected to said compressor and responsive to the rate of change of speed of said compressor, fuel valve control means responsive to said first and second means for controlling said fuel valve and thereby the fuel supply to the engine as a function of said fuel flow and a change in the rate of change of speed of said compressor as the compressor operation approaches said characteristic range of unstable operation.

2. In fuel control apparatus for a combustion engine, including an axial compressor having a characteristic range of unstable operation as a function of engine speed, the combination of a fuel conduit for supplying fuel to the engine, a fuel valve operative with said conduit for controlling the fuel flow to said engine, fuel by-pass means including valve means connected between said conduit and a source of drain fuel pressure, and means responsive to a predetermined engine operating condition which varies with engine power output operatively connected to said valve means for actuating said valve means as a function of said engine operating condition to create thereby a periodic variation in the rate of fuel flow through said conduit to the engine, said periodic variation in the rate of fuel flow being effective to cause a predetermined periodic variation in the speed of said compressor resulting from the engine speed approaching the compressor characteristic range of unstable operation, first control means responsive to the rate of periodically varying fuel flow delivered to the engine, second control means responsive to the rate of change of the speed of the compressor, and fuel valve control means responsive to said first and second control means for controlling the fuel supplied to the engine as a function of said periodic variation in fuel flow and the rate of change of the speed of the compressor.

3. In fuel control apparatus for a combustion engine having a rotatable portion, the rotational speed of which varies with engine power output, the combination of a fuel conduit for supplying fuel to the engine, a fuel valve operating with said fuel conduit for controlling the fuel flow through said conduit in accordance with a predetermined acceleration fuel flow schedule, a fuel by-pass conduit connected between said fuel conduit downstream from said fuel valve and a low pressure drain source, means responsive to engine speed operatively connected to said by-pass conduit for varying the fuel flow therethrough so as to create a predetermined periodic pulsation in the rate of fuel flow through said fuel conduit to the engine, said periodic pulsation in the rate of fuel flow being effective to create a corresponding periodic pulsation in the speed of the engine, first control signal means operatively connected to said fuel conduit for providing a first control signal as a function of the rate of periodically pulsating fuel flow through said fuel conduit, second control signal means operatively connected to said engine for providing a second control signal as a function of the rate of change of rotational speed of said engine, and comparison means operatively connected to said first and second control signal means and operative to compare said first and second control signals to control said fuel valve as a function of said fuel flow and said rate of change of speed of said engine.

4. In fuel control apparatus for a combustion engine including an axial flow compressor, a combination of a fuel conduit connected to said engine for supplying fuel to said engine, a fuel valve in said conduit for controlling the fuel flow through said conduit, fuel flow varying means connected to said conduit for varying the rate of fuel flow through said conduit and to said engine, first control signal means operatively connected to said conduit and responsive to the rate of fuel flow through said fuel conduit for providing a first control signal as a function of the rate of fuel flow to the engine, second control signal means operatively connected to and driven by said compressor for providing a second control signal which varies as a function of the rate of change of compressor speed, and comparison circuit means operatively connected to said first and second control signal means and operative to compare said first and second control signals for controlling the operation of said fuel valve, said fuel valve being actuated toward a closed position as a result of said first control signal and said second control signal approaching a common value.

5. In fuel control apparatus for a combustion engine including an axial flow compressor having a characteristic range of unstable operation as a function of engine speed, the combination of a fuel conduit connected to said engine for supplying fuel to the engine, a fuel valve in said conduit for controlling the fuel flow through said conduit, fuel flow varying means connected to said fuel valve for introducing a predetermined variation of sinusoidal character in the fuel flow to said engine whereupon the speed of the compressor is caused to vary in a corresponding sinusoidal manner, first control signal means operatively connected to said conduit for providing a first control signal as a function of the rate of fuel flow to said engine, second control signal means operatively connected to said compressor for providing a second control signal as a function of the rate of change in speed of said compressor as the engine speed approaches the compressor characteristic range of unstable operation, and comparison means operatively connected to said first and second control signal means and operative to compare said first and second control signals for controlling the fuel valve and thereby the flow of fuel to said engine as a function of the difference between the rate of fuel flow and said rate of change in the speed of said compressor.

6. In fuel control apparatus for a combustion engine having a rotating air compressor, the combination of a fuel pump, a fuel conduit for supplying fuel to the engine from the pump, a fuel valve operatively connected to said conduit for controlling the fuel flow therethrough in accordance with a predetermined fuel flow schedule, first means operatively connected to said fuel conduit for introducing a predetermined periodic variation into the flow of fuel to the engine to create thereby a predetermined periodic variation in the speed of the compressor, second means responsive to the fuel flow through said fuel conduit and operative to produce a first control signal which varies in accordance with the rate of periodically varying fuel flow through said conduit, third means including differentiating means responsive to the speed of the compressor and operative to produce a second control signal which varies in accordance with the rate of change of speed of the compressor, fourth means responsive to said first and second control signals for comparing the same and operative to produce a third control signal representative of the difference between said first and second control signals, and fuel valve control means responsive to said third control signal operatively connected to said fuel valve for actuating the same toward a closed position when said third control signal decreases to zero.

7. In fuel control apparatus for a combustion engine having a rotating air compressor, the combination of a fuel pump, a fuel conduit for supplying fuel to the engine from the pump, a fuel valve operatively connected to said fuel conduit for controlling the fuel flow therethrough to the engine, first means including a fuel by-pass conduit connected between a source of low pressure fuel and said fuel conduit downstream from said fuel valve, and a by-pass valve in said by-pass conduit for controlling fuel flow therethrough to thereby introduce a periodic variation in the flow of fuel through said fuel conduit to the engine, said periodic variation in the flow of fuel causing a corresponding variation in the speed of said compressor, first means responsive to the periodically varying fuel flow through said fuel conduit for providing a first control signal indicative of the rate of fuel flow through said fuel conduit, second means including differentiating means responsive to the speed of the compressor for providing a second control signal indicative of the rate of change of the compressor speed, third means responsive to said first and second control signals for comparing the same and producing a third control signal indicative of the difference between said first and second control signals and fourth means responsive to said third control signal operatively connected to said fuel valve for actuating the same to cause a decrease in the flow of fuel through said fuel conduit to the engine in response to a predetermined value of said third control signal.

References Cited in the file of this patent

UNITED STATES PATENTS

| | | |
|---|---|---|
| 2,673,556 | Reggio | Mar. 30, 1954 |
| 2,702,560 | Bobier | Feb. 22, 1955 |
| 2,703,961 | Harding | Mar. 15, 1955 |
| 2,750,741 | Leeper | June 19, 1956 |
| 2,846,846 | Mock | Aug. 12, 1958 |
| 2,851,855 | Gamble | Sept. 16, 1958 |